United States Patent
Katz et al.

(10) Patent No.: US 10,169,291 B2
(45) Date of Patent: Jan. 1, 2019

(54) REUSABLE MODELING FOR SOLVING PROBLEMS

(71) Applicant: International Business Machines Corporation, Armonk, NY (US)

(72) Inventors: Michael Katz, Nahariya (IL); Vladimir Lipets, Haifa (IL); Michael Masin, Haifa (IL); Dany Moshkovich, Yokneam Ilit (IL); Segev E Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/161,303

(22) Filed: May 23, 2016

(65) Prior Publication Data

US 2017/0337042 A1 Nov. 23, 2017

(51) Int. Cl.
*G06F 17/10* (2006.01)

(52) U.S. Cl.
CPC .................................. *G06F 17/10* (2013.01)

(58) Field of Classification Search
None
See application file for complete search history.

(56) References Cited

U.S. PATENT DOCUMENTS

| | | | |
|---|---|---|---|
| 7,725,339 B1 | 5/2010 | Aykin | |
| 8,131,576 B2 | 3/2012 | Rothberg et al. | |
| 2004/0249813 A1* | 12/2004 | Singh | G06F 8/20 |
| 2008/0065573 A1* | 3/2008 | Macready | G06N 7/08 706/19 |
| 2008/0148229 A1* | 6/2008 | Gownder | G06F 8/35 717/115 |
| 2009/0228291 A1* | 9/2009 | Rothberg | G06F 17/11 705/348 |
| 2009/0313091 A1* | 12/2009 | Bloom | G06F 8/10 705/7.36 |
| 2011/0071809 A1* | 3/2011 | Keidar-Barner | G06F 17/504 703/6 |

(Continued)

FOREIGN PATENT DOCUMENTS

JP 5754709 7/2015

OTHER PUBLICATIONS

Sebastian Terrazas-Moreno., "An efficient method for optimal design of large-scale integrated chemical production sites with endogenous uncertainty", Computers & Chemical Engineering, vol. 37, Feb. 10, 2012, pp. 89-103.

*Primary Examiner* — Daxin Wu
(74) *Attorney, Agent, or Firm* — Ziv Glazberg (57) ABSTRACT

A computer program product comprising a non-transitory computer readable storage medium retaining program instructions configured to cause a processor to perform actions, which program instructions implement: a framework for creating a model of an NP-hard problem, the model comprising at least one entity selected from the group comprising: an objective, a variable, an equation and a constraint, wherein the framework provides methods for automatically transforming the model, comprising: one or more methods for manipulating or changing a status of the entity of the model, the methods comprising a method for imposing or ignoring the constraint; and one or more methods related to operations to be applied to the entity of the model.

10 Claims, 2 Drawing Sheets

(56) References Cited

U.S. PATENT DOCUMENTS

| | | | |
|---|---|---|---|
| 2011/0161266 A1* | 6/2011 | Gillespie | G06F 17/11 706/17 |
| 2012/0266130 A1* | 10/2012 | Kinnucan, Jr. | G06F 8/10 717/105 |
| 2014/0316839 A1 | 10/2014 | Furman et al. | |
| 2015/0058270 A1 | 2/2015 | Kawata et al. | |
| 2015/0178418 A1* | 6/2015 | Gu | G06F 17/505 716/107 |

* cited by examiner

REUSABLE MODELING FOR SOLVING PROBLEMS

TECHNICAL FIELD

The present disclosure relates to a model for solving problem in general, and to reusable model for solving large scale problems in particular.

BACKGROUND

A lot of optimization problems which arise from real life situations and requirements. Many of these problems are NP-hard problems, but for specific uses may be reduced to and may be solved by specific solvers, for example the problems may be reduced to Mixed Integer Linear problems, which may be solved efficiently using a corresponding solver, such as Mixed-integer linear programming (MILP) solver.

In many cases these problems are NP-hard, but can be tuned or simplified for certain use cases and solved efficiently by MILP solvers. Typically, optimization experts create models dedicated to a specific use case, wherein the obtained model may then be solved by a solver such as a MILP solver.

Creating an optimization model is a time consuming and expensive process, especially in the case of a complex and large scale problem, and keeps rising when changes are introduced to the optimization problem, for example adding new types of tasks. Modifying a model may require further programming, testing, and redeployment.

The scale, complexity and variability of these problems make it almost impossible to create an all-in-one universal model of given problem which solves all cases. Then, the common practice is to apply decomposition methods and solve a separate model for each case.

BRIEF SUMMARY

One exemplary embodiment of the disclosed subject matter is a computer program product comprising a non-transitory computer readable storage medium retaining program instructions configured to cause a processor to perform actions, which program instructions implement: a framework for creating a model of an NP-hard problem, the model comprising at least one entity selected from the group comprising: an objective, a variable, an equation and a constraint, wherein the framework provides methods for automatically transforming the model, comprising: one or more methods for manipulating or changing a status of the entity of the model, comprising a method for imposing or ignoring the constraint; and one or more methods related to operations to be applied to the entity of the model.

Another exemplary embodiment of the disclosed subject matter is a computer program product comprising a non-transitory computer readable storage medium retaining program instructions configured to cause a processor to perform actions, which program instructions comprise: code implementing a model for solving an NP-hard problem, the model comprising at least one entity selected for the group consisting of: an objective, a variable, an equation and a constraint, the model calling methods for automatically transforming the model, comprising: one or more methods for manipulating or changing a status of the entity of the model, comprising a method for imposing or ignoring the constraint; and one or more methods related to operations to be applied to the entity of the model.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem handled by the disclosed subject matter is the need to solve NP-hard problems optimization problems.

Typically, a model is created by an optimization expert. Later, when changes are introduced, for example increasing the problem size or adding variables, constraints or objectives it may be required to re-implement the model.

Unfortunately, the scale, complexity and variability of these problems make it practically impossible to create an overall model of a given problem, which may be useful in solving all cases. In particular, large scale problems may be unsolvable even where similar problems of smaller case are solvable.

For example, an airline may have a system for assigning people to shifts. The system may work fine and provide results within a reasonable period of time for assigning pilots, when one to three pilots are assigned to each flight. However, when it is required to assign flight attendants, the system may not provide results within a reasonable amount of time, due to the large number of flight attendants required for every flight compared to the number of pilots.

Thus, since the same model cannot always be used for solving large scale problems, the common practice is thus to design and solve separate models on a case by case basis, and obtain specific solutions. However, this is highly time consuming in development, testing and deployment time, and may require experts in programming as well as in the problem domain.

One technical solution is a framework for defining models, wherein the framework comprises features for defining a model that can then be solved, as well as features enabling reusage of a model. In some exemplary embodiments of the disclosure, reusage may relate to setting attributes or values of one or more entities of the model, in order to solve an extended or large scale case.

In some exemplary embodiments of the disclosure, the framework may be implemented as a collection of libraries, classes, methods and variables. A model may be created by importing or otherwise using the libraries, inheriting any of the classes and/or creating instances thereof, calling and/or overriding the methods, using the variables, or the like.

In some exemplary embodiments of the disclosure, the framework may comprise functions for creating a model comprising one or more variables; objectives; constraints; additional entities; functions, methods or other descriptions of a behavior of any of the entities mentioned above; or the like.

A framework in accordance with some embodiments of the disclosure may further comprise functions or methods, which when called change an attribute or a behavior of functions or variables of a created model. It will be appreciated that the model may be changed dynamically, i.e. during runtime, rather than creating and executing different models as in prior art solutions.

For example, a framework may comprise one or more functions or methods for:

Constraint leveling, i.e., enforcing or ignoring a constraint of the model;

Attribute management of decision variables, for example when a problem is solved in multiple stages, an attribute in an iteration may be fixed to a value it obtained in a previous iteration, wherein an attribute is an indication to the behavior of the variable, for example whether it is fixed, released, or others;

Associating a constraint or a variable with a business object, for example associating the number of shifts assigned to a pilot with the salary of the pilot;

Distinguishing skeleton variables, i.e., indicating one or more variables as a basis for determining values of one or more other variables;

It will be appreciated that the functions detailed above relate to manipulating or changing the status of an entity of a model created by the framework. The functions detailed below refer to operations to be applied to one or more entities:

Freezing a variable to any fixed value, such as zero, one, or another value, or to a value depending on a current value of another variable, in accordance with an attribute, a skeleton variable, a custom criteria, or undoing said freezing. The fixing operation may have random probability, for example a variable may have a probability of 50% to be fixed;

Fixing a variable to any value, such as zero, one, a random value, or to a value depending on a current value of another variable, in accordance with an attribute, a skeleton variable, a custom criteria, or undoing of the fixing. Unlike freezing, which sets the value of a variable for the whole execution, when fixing a variable it may be later set to another value.

Setting a variable to any value, such as zero, one, a random value, or to a value depending on a current value of another variable, in accordance with an attribute, a skeleton variable, a custom criteria, or undoing of the setting. Unlike freezing or fixing, setting a value to a variable remains in effect for a current iteration only.

It will be appreciated that further functions may be provided for managing the entities or the operations of a defined model.

It will also be appreciated that a created model for which one or more of these functions are called and change the model dynamically, may be used for multiple scenarios, order of magnitudes, or the like.

For example, a model may be defined which solves an initial problem with a predetermined set of constraints. After an initial solution, for example to a reduced problem having less constraints is obtained, one or more variables, constraints, or other entities in the model may be changed in accordance with the obtained solution, thus enabling a solution to a more complex or large scale problem.

One technical effect of using the disclosed subject matter is the creation of a model based on a set of entities which support predefined functionality. The model may be further enhanced with functionality provided by the framework, using which a professional such as a software engineer or a domain person may, with minimal development effort, create optimization flows for a problem, thereby reducing overall development cost.

The framework also allows for multi-staged solving process, wherein on each stage a different subset of the constraints or objectives may take effect, thus enabling solution of more complex or large-scale problems than a single-layered solution enables. Thus, the implementation of optimization solution is made significantly easier and requires minimal tuning effort.

In particular, the framework allows to easily create extended column generation based heuristics, or to write custom heuristics with low development effort, without changing the model.

Another technical effect of the disclosure is the improved efficiency and effectiveness of computer resources used. For example a problem may be solved using the disclosed subject matter within a fraction of the time and computing power required for solving in conventional way, thus achieving significant saving and enhanced efficiency of the computing environment.

Another technical effect of the disclosure is that a professional using the framework for defining a model may provide additional meta-information about the model, which can be used later for creating enhanced flow scenarios. The professional may also provide a set of criteria associated with each optimization artifice, to allow different solving policies to be applied to the problem. This allows for multi-user creation of models and more efficient usage of human resources.

Figure 1:
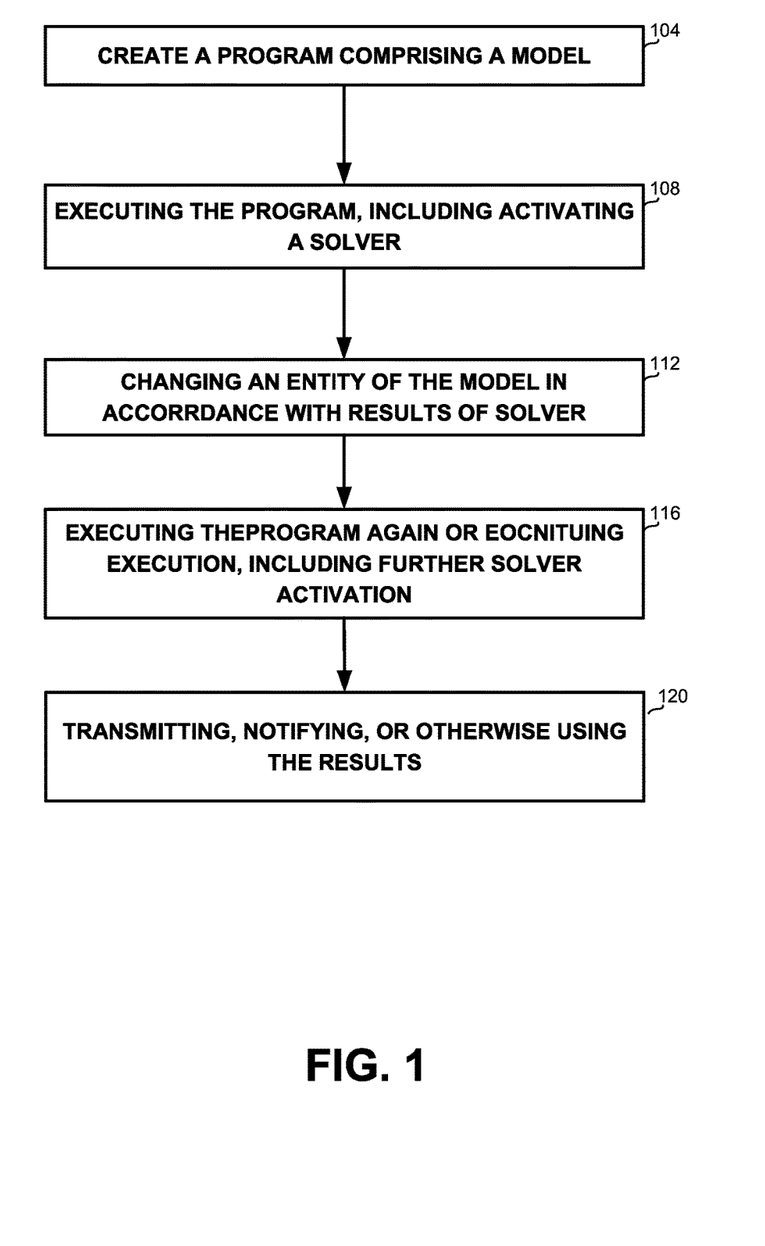
FIG. 1 is shows a flowchart diagram of a method for creating and using a model for solving problems, in accordance with some exemplary embodiments of the disclosure.

Referring now to FIG. 1, showing a flowchart of a method for creating and using a model for solving problems, in accordance with some exemplary embodiments of the disclosure.

On step 104, a user using the framework may create a program, said creation comprising defining a model, such that executing the program creates a representation of the model in memory, the model comprising variables, constraints and objectives.

On step 108, the program may be executed and a solver may be called as part of the execution. For example, a MILP solver may be called for solving model with linear constraints and objectives.

On step 112, an entity of the model may be changed, either automatically as part of the program or by updating the model in accordance with results returned by the solver. In some embodiments, the change may be introduced to the program code while creating the initial model, such that execution of the program comprises two or more iterations, wherein each iteration is different from a preceding one. This allows for creating dedicated optimization flows, and provides for solving extended cases, such as problems of larger scale. It will be appreciated that the main model is the base model for all the updates, and can be reused over and over again.

On step 116 the program may be executed again, or a previous execution may continue, with the updated model, and the solver may then be called again.

It will be appreciated steps 112 and 116 may be repeated further for further iterations.

On step 120, the results obtained during the last iteration may be returned to the user, sent to a file or otherwise transmitted, notified, or used.

Figure 2:
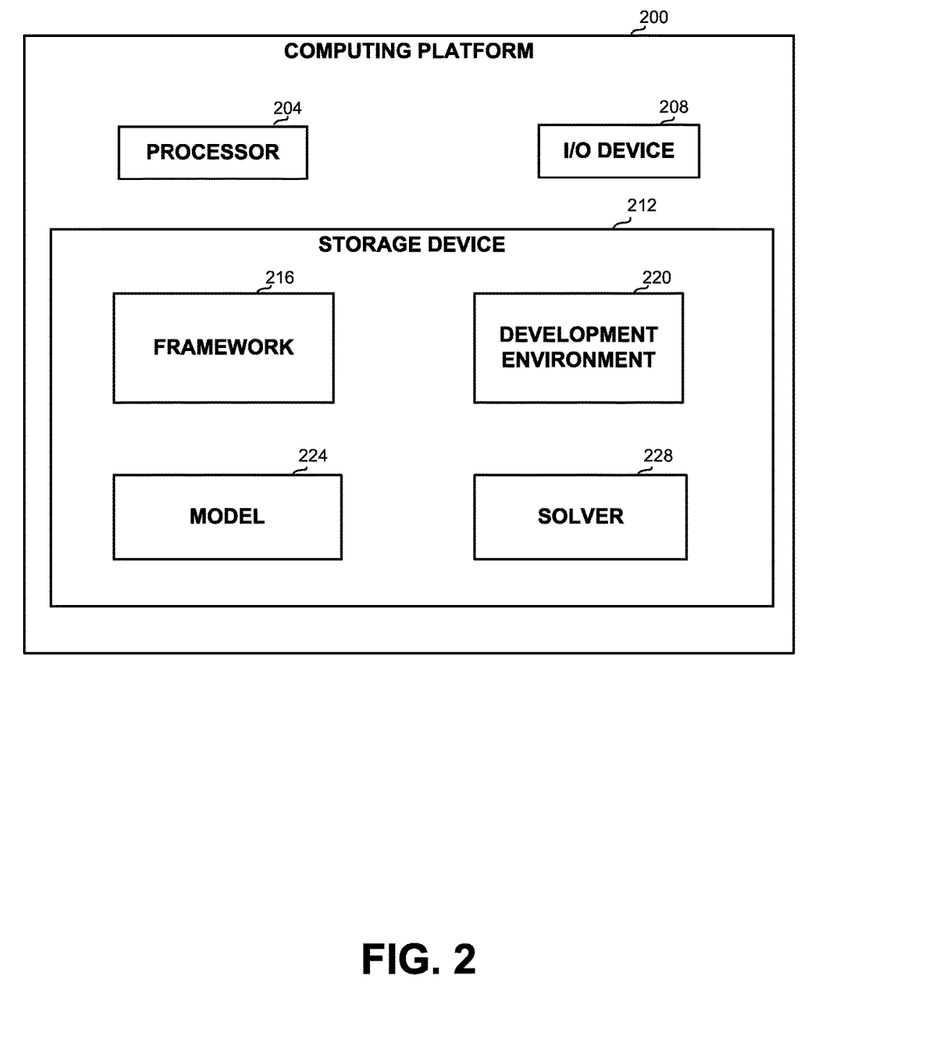
FIG. 2 shows a block diagram of an apparatus for creating and using a model for solving problems, in accordance with some exemplary embodiments of the disclosed subject matter.

Referring now to FIG. 2, showing a block diagram of an apparatus for creating and using a model for solving problems, in accordance with some exemplary embodiments of the disclosed subject matter.

The apparatus may be implemented on computing platform 200 comprising a processor 204. Processor 204 may be one or more Central Processing Unit (CPU), a microprocessor, an electronic circuit, an Integrated Circuit (IC) or the like. Processor 204 may be configured to provide the required functionality, for example by loading to memory and activating the modules stored on storage device 212 listed below.

Computing platform 200 may also comprise Input/Output (I/O) device 208 such as a display, a pointing device, a keyboard, a touch screen, or the like. I/O device 208 may be utilized to provide output to and receive input from a user, for example creating the model Computing platform 200 may also comprise a storage device 212, such as a hard disk drive, a Flash disk, a Random Access Memory (RAM), a memory chip, or the like. In some exemplary embodiments, storage device 212 may retain program code operative to cause processor 204 to perform acts associated with any of the modules listed below.

It will be appreciated that computing platform 200 may be implemented as one or more computing platforms which may be in communication with one another. It will also be appreciated that processor 204 may be implemented as one or more processors, whether located on the same platform or not.

Storage device 212 may comprise framework 216 which provides for creating a model 224, that may also be stored on storage device 212, wherein model 224 may comprise constraints, objectives, variables and optionally further entities. The framework further provides for manipulating the entities such as the objectives, constraints, variables, or the like.

Model 224 may be created using development environment 220 also stored on storage device 212, which may be implemented as an Integrated Development Environment (IDE).

Storage device 212 may comprise solver 228, for solving the model, for example assigning values to the variables such that the valid constraints hold and an objective is achieved.

In some embodiments, a Mixed Integer Linear Programming (MILP) may be used as solver 228, for solving problems that lend themselves to a representation comprising linear equations and constraints. It will however be appreciated that the disclosure is not limited to linear problems or linear solvers.

In some embodiments, a user may program and execute a model from development environment 220, which may then also activate solver 228 and obtain responses therefrom.

EXAMPLE

The following is a simple example intended for demonstrating the subject matter. It is not intended to be exhaustive or to thoroughly exemplify all features or to otherwise limit the scope of the disclosure.

In an exemplary problem, a list of trips a bus company is offering is given, each trip characterized by a vehicle ID, origin location, destination location, start time and end time. It is required to plan driver duties of up to nine (9) hours each, so as to minimize the number of assigned duties and minimize penalty (detailed below), wherein minimizing the number of duties is the main objective, with limitations including: A) A driver may switch a vehicle during her duty only at the same stop where she departed from the previous vehicle, and not more than once during the duty; and B) Every 4 hours a driver must get a continuous break of at least 30 minutes length. If a driver starts (or finishes) the duty at a different stop then the origin of the first ride (or the destination of the last), a penalty of 30 minutes working time should be added to the driver's duty and this time is not counted towards the 4 hours maximum working time without a break, nor for the maximum 9 hours duty work time.

It will be appreciated that the first objective is reducing the number of duties. The second objective is reducing their durations. The framework allows for defining the problem with two objectives as stated, but solves them separately without having to change the model. Thereby, the model allows for solving low scale problems "as is", while for large scale problems custom flow is added on top of the model. It will be appreciated that Listing 1 and Listing 2 below are not intended to provide complete compilable and executable code, but rather demonstrate the usage of some of the functions provided by the framework for setting and updating variables. Listing 2 further demonstrates the usage of a two-stage solution in which a variable is set on a second iteration to a value determined by a solver activated on a first iteration, followed by a second activation of the solver.

Listing 1 comprises code for defining the model, including defining variables and equations. In some code lines, an explanation is provided at the end of the line or on the following line as a comment, following the "//" string. The code creates a model (the "new MPMpdel" command, indicated by *), creates an equation that enforces minimal number of duties (the "createOrFindEquation" command, indicated by ), sets the number of duties to be a constraint ("setLevels" command, indicated by *), and creates a variable (indicated by @ @)).

Listing 1

```
public class O2Matrix implements MPMatrix {
    MPModel model = new MPModel("O2", MODE.DEFAULT); // * creating a
    model
    ArrayList<DutyDo> duties = null; //list of duties (shifts)
    ArrayList<LegDo> lags = null; //list of rides
    O2Matrix(ArrayList<LegDo> lags, ArrayList<DutyDo> duties){
        this.lags=lags;
        this.duties=duties;
    } //setting the duties and rides in the matrix
    public void buildMatrix( ){
        //Creating an equation that enforces minimal number of duties
        MPEquation alld=model.createOrFindEquation ("AllDuties",SIGN.EQ,
```

Listing 1

```
0); // ** build equation for penalty
alld.setLevels(1); // *** setting the constraint level to be 1, i.e., active
MPPenalty alldPen = model.createPenalty(1000000);
alld.AddVariable(alldPen, -1); // implementing the objective of a
minimum number of duties as a penalty by setting the negative value for
each duty
MPVariable dutyNum=model.createOrFindVariable("DutyNum"); //@@
MPEquation allExact = model.createOrFindEquation("ExactDuties",
SIGN.EQ, 0); // ** Creating an equation which fixes the number of used
duties
allExact.AddVariable(dutyNum, -1);
allExact.setLevels(101); //ignore as a constraint
MPEquation alls = model.createOrFindEquation("AllSizes", SIGN.EQ,
0); // ** Creating an equation which enforces minimal duty sizes
alls.setLevels(101); //ignore as a constraint
MPPenalty allsPen = model.createPenalty(1);
alls.AddVariable(allsPen, -1);
for (DutyDo d: duties){ // loop over duties: create a binary variable, that
receives a value of 1 if and only if duty is selected
        MPVariable dv= model.createOrFindVariable("Duty",d); // @@
        alld.AddVariable(dv, 1); //minimize number of 1's, thus
    minimizing number of duties
        allExact.AddVariable(dv, 1);
        alls.AddVariable(dv, d.evalTotalDurationEx( ));
        for (LagDo 1: d.getLags( )){ //for each lag of the duty
            MPEquation      lag       =
            model.createOrFindEquation("LagCover", SIGN.EQ, 1, 1);
            // make sure lag is covered
            lag.AddVariable(dv, 1); //i.e. for each lag at least one
            containing duty is selected
        }
    }
}
}
```

Listing 1

Listing 2 below shows code for solving only for the number of duties, while disregarding the penalties. The problem is then solved (the first "solve" command, indicated by *) and a minimal number of duties is obtained. Then, the attribute of the model is changed by setting the number of duties to the determined value (the "FixValueForCode" command, indicated by ), and the problem is solved again for minimizing the penalty (the second "solve" command, indicated by *).

```
public class O2Solver {
        static ComplexWrapper cw = null;
        public static void main(String [ ] args) {
            cw = new ComplexWrapper r("c:\\tmp\\o2\\b\\"); //creating a
wrapper with file name
            ArrayList<LegDo> theLegs = O2DutyBuilder.readLags(args[0]);
//read trips to be taken
            DutyDo d = new DutyDo( );
            ArrayList<DutyDo> theDuties = d.createValidExtensions(theLags);
//create duties
            O2Matrix o2m = new O2Matrix(theLegs, theDuties);
            o2m.buildMatrix( ); //BuildMatrix is in Listing 1
            // Step 1 - determine minimal number of duties: no second
objective, only equations with level "1" or "Any" (default) are used
            cw.Solve( ); // * call solver - first time
            o2m.getModel( ).SetAllFromSolution(cw.getSolution( ));// get the
solution
            o2m.printSelectedDuties( );
            // Step 2 - the first objective (number of duties) is fixed, now
minimize penalty
            o2m.getModel( ).FixValueForCode("DutyNum"); // **
            // fixing variable responsible on number of duties.
            o2m.getModel( ).ReleaseAllValues( ); // releasing the rest of the
values
            //export to MPS file, when only equations with level "101" or with
"Any" (default) are used
            cw.Solve( ); // *** call solver - second time
            o2m.getModel( ).SetAllFromSolution(cw.getSolution( ));
        }
}
```

It was first attempted to solve the disclosed problem using an ordinary linear programming model. After one week of execution, the process was stopped and no results were obtained. Executing a program with a model as disclosed above, comprising two activations of a MILP solver provided optimal result within less than twenty minutes. Thus, the disclosed framework is efficient in creating models for rapidly and efficiently solving large scale problems, while saving development time and efforts, run time and computing resources.

In some embodiments, a computer program product may be provided which comprises an exemplary model using the framework, which users can edit and adapt to their needs. The computer program product may further comprise implementations of methods for transforming the model, or a solver for solving the problem expressed by the model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block s diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a non-transitory computer readable storage medium retaining program instructions configured to cause a processor to perform actions, which program instructions implement:
   a framework for creating a model of an NP-hard problem, wherein the model comprising at least one objective, a plurality of variables, and a plurality of constraints, wherein the model includes for each constraint a corresponding setting indicating whether the constraint is active or inactive, and wherein the framework provides methods for automatically transforming the model, comprising
      at least one method for manipulating a status indication of the at least one objective;
      at least one method for imposing or ignoring at least one of the constraints, by controlling the corresponding setting indicating whether the constraint is active or inactive; and
      at least one method for setting values of one or more of the plurality of variables to specific fixed values; and
   a solver configured to receive a model including for each constraint a corresponding setting indicating whether the constraint is active or inactive, from the framework and to solve the model created by the framework while ignoring constraints and objectives indicated as inactive by their corresponding setting, and holding values of variables that were set to specific fixed values, at the specific values to which they are fixed, so as to assign values to the variables such that the constraints indicated by their corresponding settings as active are met by the variable values and the objectives indicated as active are achieved,
   wherein the framework is configured to allow creating an optimization flow defining a multi-stage process for solving the model, by setting for each stage a different set of objectives and constraints as active, providing the model with the set of active objectives and constraints to the solver, and setting values of variables of subsequent stages to values received as results of earlier stages.

2. The computer program product of claim 1, wherein the at least one method for setting values of variables to specific values comprises a method for indicating a variable of the model as a skeleton variable.

3. The computer program product of claim 1, further comprises invoking the framework to solve the NP-hard problem, wherein the NP-hard problem is solved by:
   creating the model of the NP-hard problem;
   eliminating one or more objectives of the at least one objective of the model, whereby obtaining a simplified model representing a simplified problem;
   solving the simplified problem using the simplified model to obtain a value for the at least one variable;
   transforming the model into a modified model of the NP-hard problem using a solution of the simplified problem, wherein said transforming comprising:
      freezing, fixing or setting the at least one variable to the value; and
   solving the NP-hard problem using the modified model.

4. The computer program product of claim 1, wherein the solver comprises a Mixed Integer Linear Programming (MILP) solver.

5. The computer program product of claim 1, wherein the framework provides a method for activating a solver receiving the model as input.

6. A computer program product comprising a non-transitory computer readable storage medium retaining program instructions configured to cause a processor to perform actions, which program instructions comprise:
   code implementing a model for solving an NP-hard problem, wherein the model comprising at least one objective, a plurality of variables, and a plurality of constraints, wherein the model includes for each constraint a corresponding setting indicating whether the constraint is active or inactive, and the model calling methods for automatically transforming the model, comprising:
      at least one method for manipulating a status indication of the at least one objective;
      at least one method for imposing or ignoring the at least one of the constraints, by controlling the corresponding setting indicating whether the constraint is active or inactive; and
      at least one method for setting values of one or more of the plurality of variables to specific fixed values; and
   a solver configured to receive a model including for each constraint a corresponding setting indicating whether the constraint is active or inactive, from the framework and to solve the model created by the framework while ignoring constraints and objectives indicated as inactive by their corresponding setting, and holding values of variables that were set to specific fixed values, at the specific values to which they are fixed, so as to assign values to the variables such that the constraints indicated by their corresponding settings as active are met by the variable values and the objectives indicated as active are achieved,
   wherein the code is configured to allow creating an optimization flow defining a multi-stage process for solving the model, by setting for each stage a different set of objectives and constraints as active, providing the model with the set of active objectives and constraints to the solver, and setting values of variables of subsequent stages to values received as results of earlier stages.

7. The computer program product of claim 6, further comprising implementations of the methods for automatically transforming the model.

8. The computer program product of claim 6, further comprising a solver for solving the NP-hard problem as expressed by the model.

9. A method for solving an NP-hard problem by a computer, comprising:
   receiving, by a framework for creating a model of an NP-hard problem, a definition of the problem, including at least one objective, a plurality of variables and a plurality of constraints, wherein the model includes for each constraint a corresponding setting indicating whether the constraint is active or inactive, and wherein the framework provides methods for automatically transforming the model, comprising at least one method for manipulating a status indication of the at least one objective, at least one method for imposing or ignoring at least one of the constraints, by controlling the corresponding setting indicating whether the constraint is active or inactive, and at least one method for setting values of one or more of the plurality of variables to specific fixed values;

creating an optimization flow defining a multi-stage process for solving the model, by setting for each stage a different set of objectives and constraints as active, providing the model with the set of active objectives and constraints to a solver, and setting values of variables of subsequent stages to values received as results of earlier stages; and providing the model to the solver in each stage of the created optimization flow, along with the set of objects and constraints defined as active for the stage, and solving the provided model in each stage, by the solver, while ignoring constraints and objectives of the stage indicated as inactive by their corresponding setting, to obtain a solution for at least one variable and setting the at least one variable to the obtained solution value for the subsequent stage.

10. The method of claim 9, wherein the solver comprises a Mixed Integer Linear Programming (MILP) solver.

* * * * *